United States Patent
Maurer et al.

(10) Patent No.: US 7,050,650 B2
(45) Date of Patent: May 23, 2006

(54) USER SELECTED BACKGROUND NOISE REMOVAL FOR SCANNED DOCUMENT IMAGES

(75) Inventors: Ron P. Maurer, Haifa (IL); A. Marie Vans, Shefar-am (IL); Carl Staelin, Haifa (IL); Kristin M. Smith, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 65 days.

(21) Appl. No.: 10/087,584

(22) Filed: Feb. 28, 2002

(65) Prior Publication Data

US 2003/0161007 A1 Aug. 28, 2003

(51) Int. Cl.
  G06K 9/40 (2006.01)
(52) U.S. Cl. .................. 382/275; 358/326; 358/463
(58) Field of Classification Search ........... 358/527, 358/3.26, 463, 1.9, 3.23, 450, 464; 382/275, 382/168, 169, 172, 228, 254, 270
See application file for complete search history.

(56) References Cited

U.S. PATENT DOCUMENTS

| | | | | |
|---|---|---|---|---|
| 4,812,904 A * | 3/1989 | Maring et al. | ........... | 348/135 |
| 5,289,297 A * | 2/1994 | Bollman et al. | ........... | 358/537 |
| 5,389,978 A * | 2/1995 | Jeong-Hun | ........... | 348/622 |
| 5,668,897 A * | 9/1997 | Stolfo | ........... | 382/283 |
| 5,761,338 A * | 6/1998 | Kasamatsu | ........... | 382/176 |
| 5,831,748 A | 11/1998 | Tsukada et al. | | |
| 5,907,665 A * | 5/1999 | Sobol et al. | ........... | 358/1.9 |
| 5,943,045 A | 8/1999 | Ikeshoji et al. | | |
| 6,144,763 A * | 11/2000 | Ito | ........... | 382/166 |
| 6,160,923 A * | 12/2000 | Lawton et al. | ........... | 382/275 |
| 6,198,845 B1* | 3/2001 | Tse et al. | ........... | 382/169 |
| 6,240,215 B1* | 5/2001 | Salgado et al. | ........... | 382/254 |
| 6,271,934 B1* | 8/2001 | Hayashi | ........... | 358/1.9 |
| 6,323,957 B1* | 11/2001 | Ball | ........... | 358/1.9 |
| 6,590,676 B1* | 7/2003 | Karidi | ........... | 358/1.9 |
| 6,603,880 B1* | 8/2003 | Sakamoto | ........... | 382/173 |
| 6,621,595 B1* | 9/2003 | Fan et al. | ........... | 358/3.26 |
| 6,636,635 B1* | 10/2003 | Matsugu | ........... | 382/218 |
| 2002/0060819 A1* | 5/2002 | Nara | ........... | 358/530 |
| 2003/0012414 A1* | 1/2003 | Luo | ........... | 382/118 |
| 2003/0068093 A1* | 4/2003 | Baggs | ........... | 382/261 |
| 2003/0117392 A1* | 6/2003 | Harvill | ........... | 345/419 |

FOREIGN PATENT DOCUMENTS

| EP | 0535931 | 4/1993 |
|---|---|---|
| EP | 0889643 | 1/1999 |
| WO | WO0070863 | 11/2000 |

OTHER PUBLICATIONS

Bouton et al, Inside Adobe Photoshop 5, 1998, New Riders Publishing, p. 161 and 255-257.*

* cited by examiner

Primary Examiner—Von J. Couso

(57) ABSTRACT

A system and method of removing background noise from a digital image of a scanned document is described. The system and method is a reversible background noise removal technique that allows a user to select whether background noise is removed or not. In addition, since the present invention divides the background noise removal operations into a two phase process, the overall efficiency of the system and method are significantly improved.

16 Claims, 9 Drawing Sheets

USER SELECTED BACKGROUND NOISE REMOVAL FOR SCANNED DOCUMENT IMAGES

FIELD OF THE INVENTION

The present invention relates to a system and method of image processing, and in particular this disclosure provides a system and method for removing unwanted background image data from scanned document images by user selection.

BACKGROUND OF THE INVENTION

Scanners and copiers are well-known office machines that provide valuable office functions both in the workplace and at home. One important component of these scanners and copiers is the image processing that automatically filters noise (unwanted information) from the scanned document.

Two-sided documents, i.e., documents having text and/or pictorial content on both sides of the paper, present challenges for producing quality copies of the original documents. When two-sided documents are scanned in a copy machine or a scanner, visual noise may appear in the copies that was not present on the scanned surfaces of the original documents. The visual noise may be the result of digitally captured text and/or pictorial content printed on the opposite side of a scanned surface commonly referred to as bleed-through. Bleed-through is more prevalent for copies of documents having a white or very light color background. In addition, the thickness of the scanned documents may increase the intensity of the bleed through effect, since thinner paper is more transparent than thicker paper. Moreover, when scanning a paper document, the paper is generally not captured as exactly white as a result of inaccurate calibration of the scanner with respect to each paper type. The combination of the non-white background and bleed-through both reduce visual quality of the scanned documents, especially when printing them, since slightly off-white color is typically rendered as scattered dots by printers.

Certain known background noise removal techniques consist of estimating the background color of the scanned-in document by analysis of local or global tone-statistics of the document image, and then applying a local or global tone-mapping which maps the estimated background color or lighter tones to pure white.

FIG. 1A illustrates the steps of one type of prior art scanning or copier system including scanning 10, image processing 11, rendering 12, and displaying or printing 13 a document image. Frequently, this type of system uses a type of processing technique referred to as "single pass" since typically all operations are performed within the system (e.g., copier) in a single irreversible processing pass. A system designed using the "single pass" technique generally only allows for a small amount of buffered image data for processing. The entire image is not stored and all processing is performed within the system such that there is no need for image compression, transmission, decompression, or off-line computing. Processing is often performed cumulatively and then processed data is immediately printed. As shown in FIG. 1A, background noise removal is performed during image processing. To date, this background noise removal technique has been irreversible in the "single pass" type system. In other words, once the background noise removal technique has been performed the original image data of the document is no longer available due to the single pass processing technique which can potentially cause a loss of visually important information. In some cases background noise removal may be undesirable if the type of document image does not lend itself to typical background noise removal processes and removal results are typically poor. However, according to this system, if the background noise removal technique does not perform satisfactory, the user does not have the option of regaining or using the visual information-lost during the background removal process.

FIG. 1B shows the steps of another type of known scanning or copier system which can be formed by using an add-on background removal function with a pre-existing scan system. According to this type of system, image data is stored and available for performing background removal operations, however, the background removal operations are performed inefficiently within the system. Specifically, a document image is scanned 14 and processed 15 to enhance the image. After scanning and processing, the processed image data is stored 16. Background noise removal 17 is performed by accessing the stored image and performing all of the necessary statistical operations to derive a background noise removal function. These operations often require highly computational and complex statistical image data analysis. Hence, each time background noise removal is performed in the system shown in FIG. 1B, these highly computational steps are repeated. Often, the analysis performed during background noise removal is similar to or the same as the analysis performed during image processing step 15, however, according to this type of prior art processing technique these highly computational analysis and processing steps are repeated since all of the background removal is performed after the image has been stored and the prior analysis results are not made available for use during background noise removal. Consequently, this type of system performs background noise removal in an inefficient manner.

Hence a need exists for an efficient system and method of background noise removal of a scanned document that also provides a user with the ability to reverse and/or control the background noise removal process after scanning the document.

SUMMARY OF THE INVENTION

A system and method of removing background noise from a digital image of a scanned document is described. The system and method is a reversible background noise removal technique that allows a user to select whether background noise is removed or not. In addition, since the present invention divides the background noise removal operations into a two phase process, the overall efficiency of the system and method are significantly improved.

According to a first embodiment of the system and method, during a first phase (i.e., prior to image storage) statistical data is obtained and a background noise removal tonemap function is derived and during a second phase (i.e., after image storage) background noise removal is performed using the tonemap derived in the first phase. In particular, during the first stage, statistical data is obtained from the scanned document image data and the background noise removal tonemap function for the entire image is derived from the statistical data. The image data and the tonemap function are then stored. During the second stage and upon user selection, background noise is removed by retrieving the image data and tonemap function and using the tonemap function to convert pixel values in the digital image. Alternatively, during the second stage the user may also select to bypass background noise removal prior to image rendering. In one embodiment, the statistical data corresponds to an estimated global background tone value.

According to this embodiment, the scanned document image data can be pre-processed, for instance enhanced, while determining the statistical data prior to storing the image data and the tonemap function or the statistical data. In another embodiment, the processed image data and a look-up table (LUT) corresponding to the tonemap are stored. In still another embodiment, the LUT and the processed image are stored according to a predetermined data format.

According to a second embodiment of the system and method, during the first phase (i.e., prior to image storage) statistical data is obtained and during the second stage (i.e., after image storage) the background noise removal tonemap function is derived (using the statistical data obtained in the first phase) while performing background noise removal and upon user selection. In particular, during the first phase, statistical data is obtained from the document image data. The image data and the statistical data are then stored. During the second stage and upon user selection, background noise is removed by retrieving the image data and statistical data and a background noise removal tonemap function is derived. The tonemap function is used to convert pixel values in the digital image. Alternatively, during the second stage the user may also select to bypass background noise removal in which case, the tonemap function is not derived.

According to this embodiment, the scanned document image data can be processed, for instance enhanced, while determining the statistical data prior to storing the image data and the statistical data. The statistical data can include but is not limited to histograms of the image data and an estimated global background tone value.

Other aspects and advantages of the present invention will become apparent from the following detailed description, taken in conjunction with the accompanying drawings, illustrated by way of example of the principles of the invention.

DETAILED DESCRIPTION OF THE INVENTION

A system and method of background noise removal from scanned document image data, is described. In general, the present invention provides a system and method for efficiently performing user selected background noise removal on a scanned document image.

For purposes of this description, document image data is generally defined as image data including textual, graphical, and natural image data. The background of a scanned document image, is generally defined as the predominant area other than the text, graphics, and natural images included within the image. Background noise is generally defined as any image data within the background area of the image that was not in the original image of the document or other unintended undesirable image data within the background area.

Figure 1A:
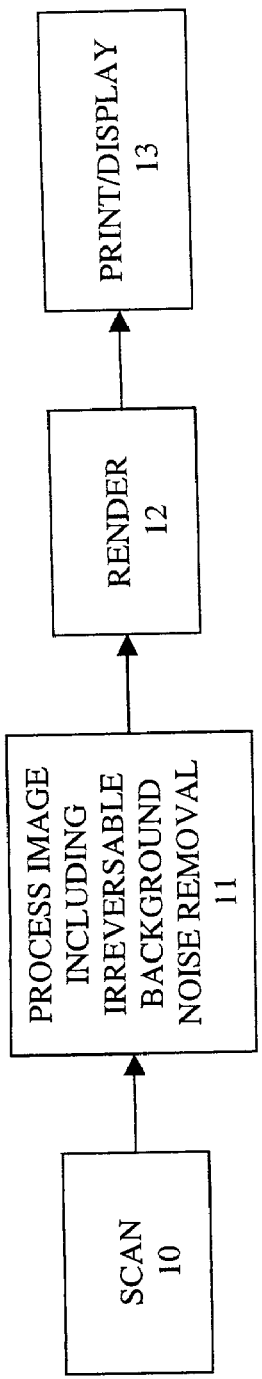
FIG. 1A illustrates a first prior art processing system including irreversible background noise removal.
Figure 1B:
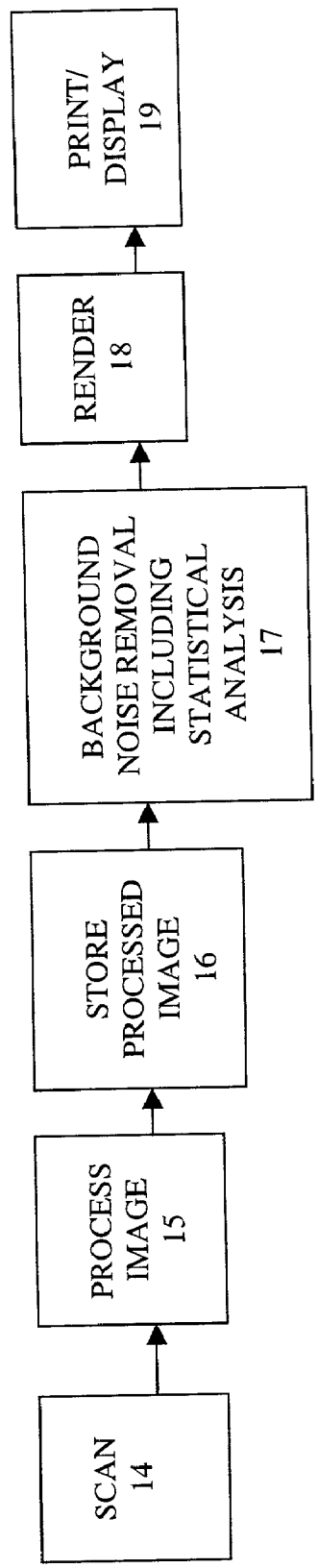
FIG. 1B illustrates a second prior art processing system which performs all statistical background analysis and background noise removal after image storage.

The present invention is based on a document scanning technique in which the entire document image data is stored at some point in the process such as shown in FIG. 1B. However, unlike the system shown in FIG. 1B, the system and method of the present invention can be viewed as splitting the background noise removal operation into two phases. The first phase is generally defined to occur while the document is scanned and prior to when the entire document image data is initially stored. The second phase is generally defined to occur after the image data is loaded from file storage and prior to image display or printing. According to the present invention, certain processes of the background noise removal operation are performed within each of the first and second phases in order to enhance overall system performance and efficiency and user experience. It should be understood that when loading image data from file storage the image data is transferred from a storage area such as disk storage into main memory of a computing unit or other storage area that is adapted for ease of accessibility of the data while image processing. It should be further understood that prior to file storage the image data is typically compressed and upon loading from file storage the data is decompressed.

Figure 2A:
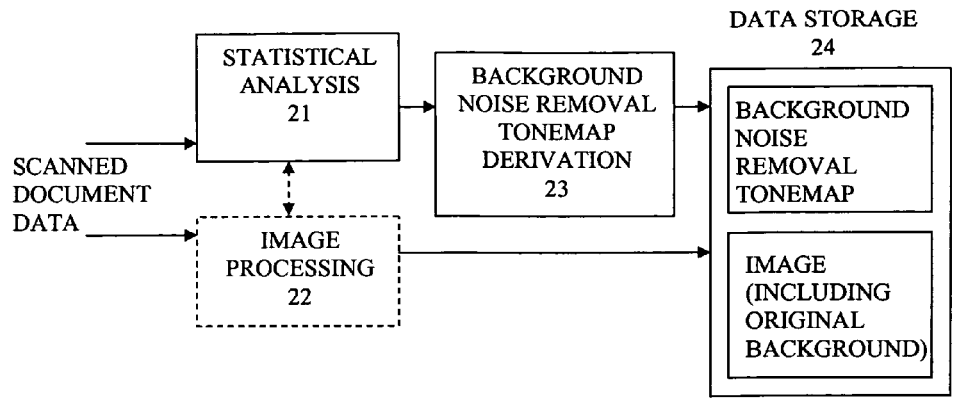
FIG. 2A illustrates a functional block diagram of a first phase of a first embodiment of background noise removal according to the system and method of the present invention.
Figure 2B:
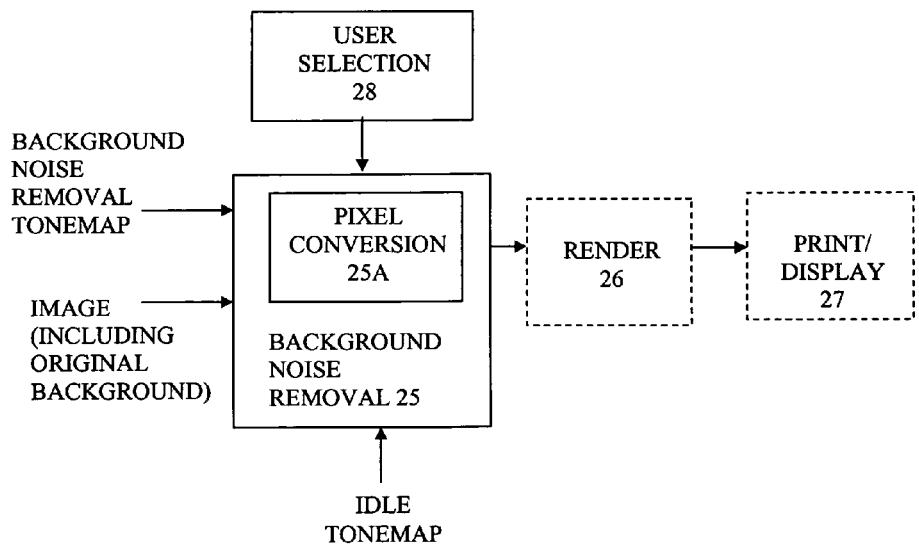
FIG. 2B illustrates a functional block diagram of a second phase of the first embodiment of background noise removal according to the system and method of the present invention.

FIGS. 2A and 2B show functional flowcharts of first and second phases, respectively, of a first embodiment of the present invention. Referring to FIG. 2A, initially, statistical analysis 21 is performed on the scanned document image data. Statistical analysis can be achieved by performing a variety of statistical operations and calculations and can generate a corresponding variety of statistical results. For instance, some statistical operations can include estimation of tone probability distribution conditional on aspects of the image data such as edge location and size of connected components. Statistical operations can also include any estimation of tone probability using other statistical methods. Some statistical results can include the main modes of the tone probability distribution (e.g., the brightest mode corresponds to the global background tone value). A preferred statistical analysis is described herein below. According to one embodiment, statistical analysis is performed wherein an estimated global background tone value is determined.

From the statistical data obtained from the statistical analysis, a background noise removal tonemap function is determined. A tonemap function is determined that can identify pixel values corresponding to the background using the statistical data obtained from module 21 and maps the identified pixel value to a new value corresponding to a selected background color (e.g., white) by setting all of its channels to a value of a value corresponding to that color. In the case in which the statistical analysis is performed to obtain an estimated global background tone value, then the tonemap function is determined based on that value. The tonemap function is then saved as shown by data storage module 24. In an alternative embodiment (not shown), a look-up table corresponding to the background noise removal tonemap function is generated and saved.

Optionally, the scanned document image data may be pre-processed by image processing module 22 while performing statistical analysis 21 and tonemap determination 23. In general statistical data can be collected with little overhead during other image processing or enhancement operations which calculate intermediate data such as edge probability which can be used to estimate a probability distribution either conditional or not. Hence, one advantage of the subject invention is that time consuming computations which are needed by both the image processing module 22 and the statistical analysis module 21 are performed only once and the results can be used for both background noise removal and image enhancement operations. This is in contrast to the prior art system shown in FIG. 1B where these computations are performed twice, once before data storage for image enhancement and once after for background noise removal. Image pre-processing can include but is not limited to filtering so as to selectively sharpen and smooth the image. Once pre-processed, the image data is stored with the background noise removal tonemap function.

FIG. 2B shows the second phase of the first embodiment of the present invention. In this phase the stored information is retrieved including the background noise removal tonemap and the image data (that may or may not be pre-processed). The retrieved data is provided to the background noise removal module 25 which includes a pixel conversion module 25A. The pixel conversion module 25A converts the image data pixel values using either the background noise removal tonemap or an idle tonemap dependent on user selection module 28. The idle tonemap corresponds to an identity function such that the pixels values remain the same. The background noise removal tonemap function maps pixel values identified as background to a selected pixel value effectively removing any unwanted background noise. In the case in which the background noise removal LUT is stored by data storage module 24, then pixel conversion 25A is performed by indexing into the noise removal LUT with each of the image data pixel values to obtain new pixel values.

It should be noted that the image stored by data storage module 24 includes its original background pixel data. Consequently, during the second phase, the original background data has not been lost and can be provided to the user dependent on user preference.

Splitting the background noise removal operation into these two phases, facilitates reduction of repeated statistical operations that are characteristic of prior art techniques. Hence, the majority of the background-removal computation occurs within the first phase. In the second phase, performed after loading the image from storage, background-removal is applied only by user selection. The computation involved in the second phase is minimal. Thus, the user can efficiently toggle the background noise removal function on and off. For example, it is possible to view and print the image with its original background, and view and print the same image with its background noise removed.

In addition, according to the present invention the background-removal operation is reversible. The image is stored without applying background-removal, but with additional tone-mapping data, which enables an efficient rendering of the image either with background removal or without it. Thus, the user can have it both ways for every single page. In addition, compared to previous "single pass" solutions the overall computational efficiency is substantially improved, and artifacts rooted in non-uniform background-tone estimation, are avoided.

Figure 3:
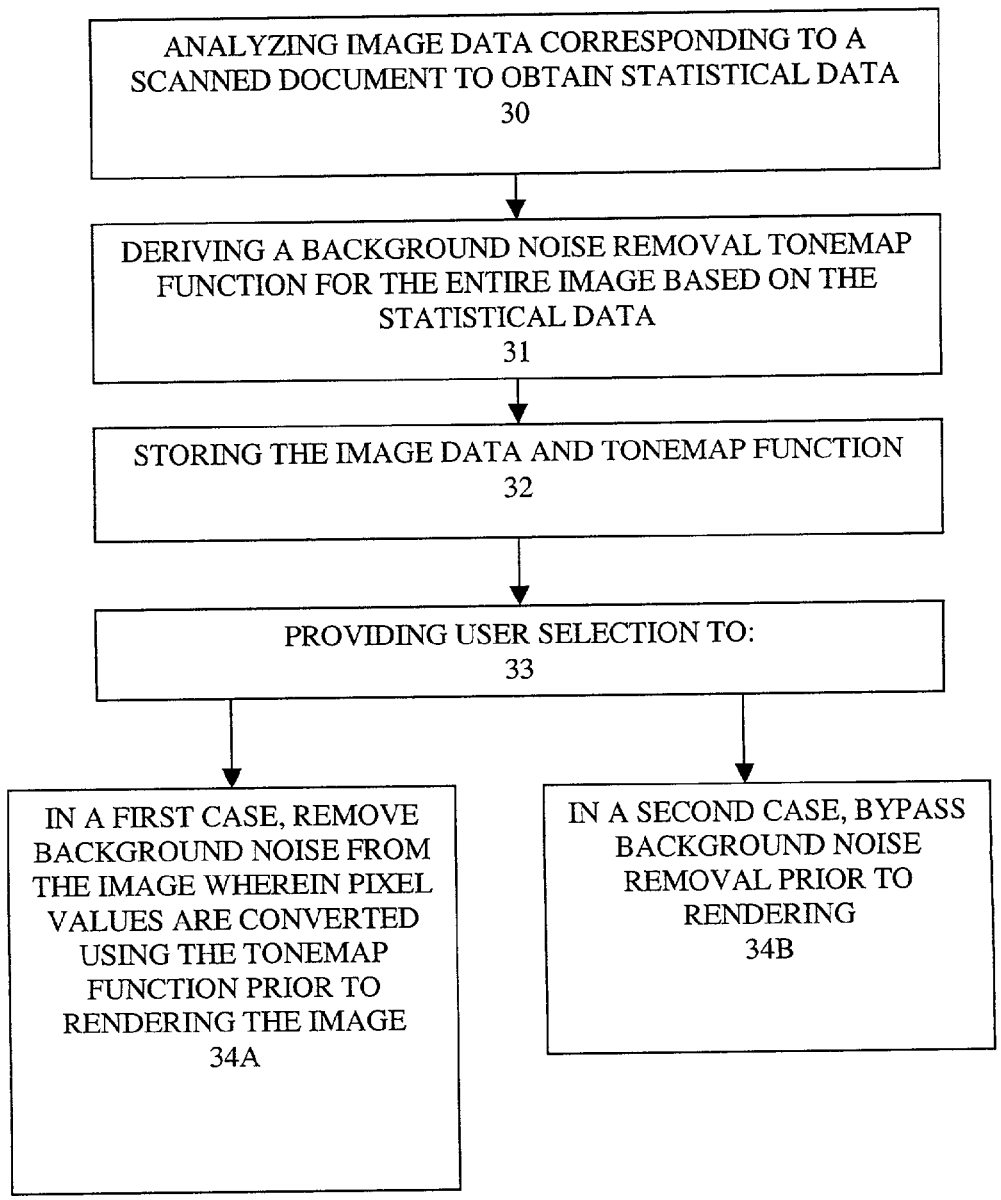
FIG. 3 illustrates a first embodiment of the method of background noise removal of a scanned document digital image.

FIG. 3 illustrates a method corresponding to the technique shown in FIGS. 2A and 2B. According to this method, initially, scanned document image data is analyzed to obtain statistical data 30. Based on the statistical data, a background noise removal tonemap function is derived 31. According to FIG. 2A, the image data is analyzed 30 and the tonemap is derived 31 in the first phase. The image data and the tonemap are then stored 32. Optionally, the image data may be pre-processed (not shown) prior to storage. The user is then allowed to select 33 between a first case in which background noise is removed by using the tonemap to convert the image pixels 34A and a second case in which background noise removal is bypassed 34B.

Figure 4A:
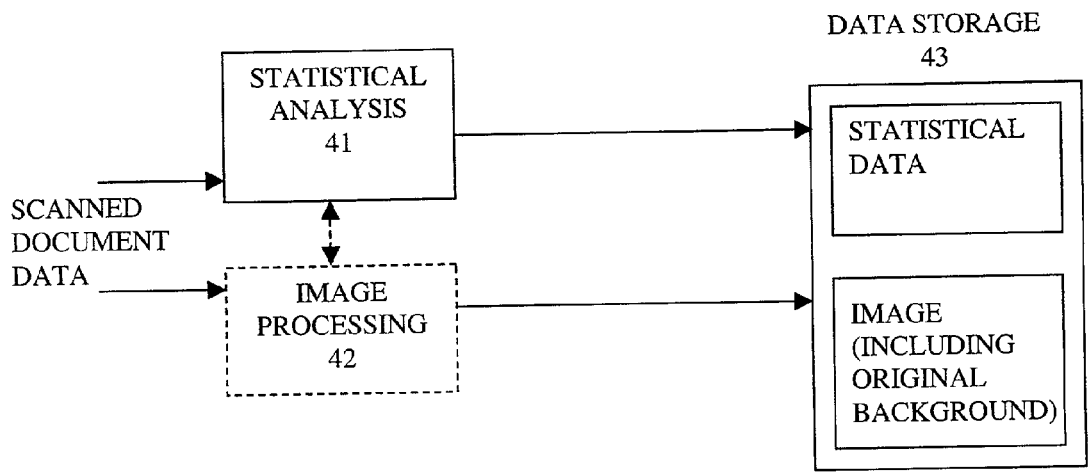
FIG. 4A illustrates a functional block diagram of a first phase of a second embodiment of background noise removal according to the system and method of the present invention.
Figure 4B:
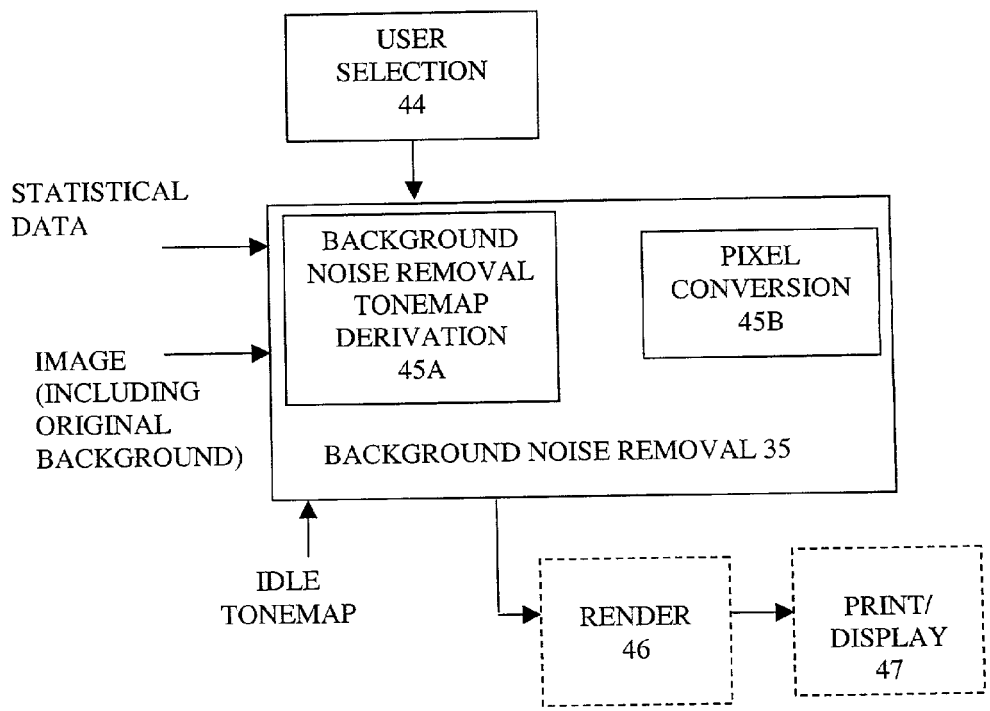
FIG. 4B illustrates a functional block diagram of a second phase of the second embodiment of background noise removal according to the system and method of the present invention.

FIGS. 4A and 4B show functional flowcharts of first and second phases, respectively, of a second embodiment of the present invention. Referring to the first phase shown in FIG. 4A, initially, statistical analysis 41 is performed on the scanned document image data. As with the embodiment shown in FIG. 2A, the image data may be simultaneously pre-processed by image processing module 42 where its intermediate computation results can be used by the statistical analysis module 41 to perform statistical estimations. In contrast with the embodiment shown in FIG. 2A, the statistical data obtained from the analysis 41 is stored by data storage module 43 instead of being used to derive a background noise removal tonemap. Both the image data (pre-processed or unprocessed) are stored by the data storage module 43. In one embodiment, the statistical data stored by module 43 can be but is not limited to at least one luminance histograms of the image data or an estimated global background tone value.

In the second phase shown in FIG. 4B, the stored statistical data and image data are retrieved and provided to the background noise removal module 45. The background noise removal module 45 include background noise removal tonemap determination 45A and pixel conversion module 45B. The user selection module 44 allows the user to determine whether background noise is to be removed or not. If the user selects background noise removal, module 45A determines a background noise removal tonemap function from the statistical data. In a preferred embodiment (not shown), a look-up table corresponding to the background noise removal tonemap function is generated and saved. The pixel conversion module 45B then uses either the stored background noise removal tonemap or LUT to remove the background noise from the scanned document image data. Alternatively, the user can select not to remove background noise. If so, the idle tonemap is used by pixel conversion module 45B such that the rendered and printed image retains all background information.

Figure 5:
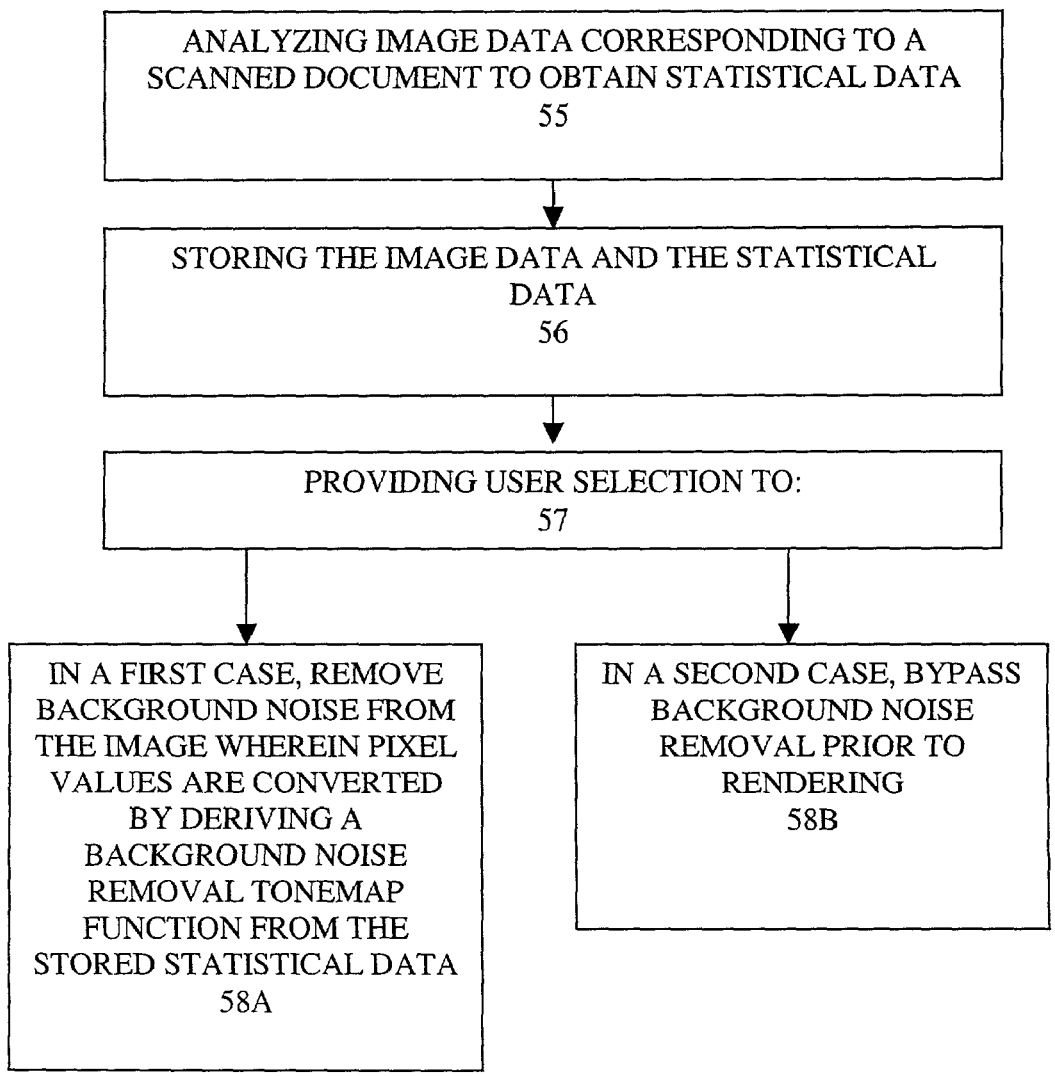
FIG. 5 illustrates a second embodiment of the method of background noise removal of a scanned document digital image.

FIG. 5 illustrates a method corresponding to the technique shown in FIGS. 4A and 4B. According to this method, initially, scanned document image data is analyzed to obtain statistical data 55. Then, the image data and the tonemap are stored 56. Hence, in the first phase of this method, only statistical data is obtained and stored with the image data. As described above, the image data may be pre-processed (not shown) prior to storage. The user is then allowed to select 47 between a first case in which background noise is removed 58A or a second case in which background noise removal is bypassed 58B. In the first case, the background noise is removed by first deriving a background noise removal function from the retrieved statistical data and then converting the pixel values using the derived tonemap function.

In one embodiment of the invention as shown in FIGS. 2–5, the user can view the tonemapped image data in a display area (e.g., using a browser), prior to printing to determine which image (i.e., background noise removed or no background noise removed) is preferred. To enhance this option, once the image has been tonemapped to remove background noise it is stored in cache. This allows the user to switch between viewing the original image (stored in cache) and the background noise removed image (also stored in cache) without requiring any additional processing. As a result, the user is provided with both options immediately once the initial tonemapping is performed.

It should be understood that according to the systems and methods shown in FIGS. 2–5, background noise removal may be performed prior, during, or after rendering of the image data. In one preferred embodiment, background noise removal operations performed by modules 25 and 35 (FIGS. 2B and 4B) are embedded into the image data rendering process. For example, in one preferred embodiment, when a user retrieves a document image from file storage for rendering, a background removal data object is created which includes the background removal LUT ($LUT_{BR}$) and stored user options. Initially, if the user has not previously retrieved the document image from file storage, the user options are set to a default setting in which no background removal is performed. In this case, the document image is automatically processed by background noise removal modules 25 or 35 using the idle tonemap (i.e., the identity tonemap) and the processed image is stored in cache for easy access. At this point the user can select on a page-by-page basis whether to apply background noise removal using the browser. In one embodiment, the browser provides three options to the user including: 1) print according to currently stored user options; 2) remove background noise from all pages in the file; and 3) no noise removal. Once selected, the user options for each page is stored in the background removal data object and background noise removal is performed as described in conjunction with the embodiments shown in FIGS. 2B and 4B and is also stored in cache fore easy accessibility. Once a page has been processed to remove noise both the original image and the noise removed image are stored in cache allowing the user to "toggle" between the images without further processing to obtain the best results.

In another preferred embodiment, the prioritized document format is used to store the image data and statistical data, background noise removal tonemap function or background noise removal tonemap LUT. In particular, the format is implemented for storage of multiple data types such an image data, statistical data, LUTs, functions, etc. In one embodiment, the document format comprises various streams representing, among other things, the image data, the tonemap function, etc.

In one embodiment, the modules and processes shown in FIGS. 2–5 can be performed in a similar or modified manner as described in U.S. application Ser. No. 09/704,358 entitled "System and Method for Enhancing Scanned Document Images for Color Printing" filed Nov. 1, 2000, assigned to the assignee of the subject application, issued as U.S. Pat. No. 6,621,595 on Sept. 16, 2003, and incorporated herein by reference. Accordingly, the scanned document image data can be initially color converted. For instance, the scanned document image data may be color converted from a RGB color space to a $YC_bC_r$ color space. In this embodiment, the $YC_bC_r$ color space is better adapted for obtaining statistical information about the background of the scanned document image data. More particularly, statistical analysis can be limited to the luminance channel for simplified computations and adequate approximation results. Other color spaces having a separate luminance component may also be utilized.

On one preferred embodiment, the desired statistical result of the statistical analysis module (21,41) is an estimated global background tone value $Y_b$. It should be understood that the global background tone value can be estimated from all three of the $YC_bC_r$ color channels. However, satisfactory results can be obtained using the luminance channel (Y) to estimate the luminance portion of the background tone value and using that to process image data for background noise removal. Consequently, the remainder of the statistical analysis will only be described in terms of the luminance channel.

The estimated tone background value $Y_b$, is determined by initially performing edge detection of the luminance value of all pixels in the image data. Edge detection operates to detect edges of salient features such as text contained in the image data. Initially, two metrics D1 and D2 (Eqs. 1 and 2) are determined. Metric D1 corresponds to first-order derivative and metric D2 corresponds to a second-order derivative. Namely, D1 is a "morphological gradient", and D2 is a "morphological laplacian". The metric D1 is used to determine whether a pixel of interest is a part of a salient edge such as an edge between text and background. The metric D2 is used to determine whether an edge pixel is on the dark side or the bright side of the edge. The two metrics are calculated by determining for each pixel the minimum luminance (m) and maximum luminance (M) values in a 3×3 punctured neighborhood of the pixel (i.e. the eight nearest neighbors, excluding the pixel itself). In this case D1 is given by Eq. 1:

$$D1=M-m; \qquad (1)$$

and D2 is given by Eq. 2:

$$D2=M+m-2*Y', \qquad (2)$$

where Y' is either the original luminance value Y, or preferably the luminance value of a smoothed luminance image in the same location.

To determine if a pixel is part of an edge its corresponding first metric, D1, is compared to a threshold value $T_e$. That is, a pixel is part of an edge if $D1>T_e$. Furthermore, to determine if the pixel is part of the dark side or the bright side its corresponding second metric, D2, is compared to zero. Specifically, if D2>0 the pixel is on the dark side; else, the pixel is in the bright side.

The threshold $T_e$ is made adaptive by setting a minimum (initial) value ($T_e\_min$) and letting the threshold float with the maximum value of the metric D1 (i.e., D1_max) as more image data is processed. D1_max is then updated after processing each line according to the following condition: if $T_e<k*D1\_max$ then $T_e=k*D1\_max$. This condition ensures that the threshold $T_e$ can only go up. The minimum value of $T_e$ (i.e., $T_e\_min$) and the parameter k should be determined by experiments. In the preferred embodiment they are set to $T_e\_min=0$, $k=0.25$.

Figure 6A:
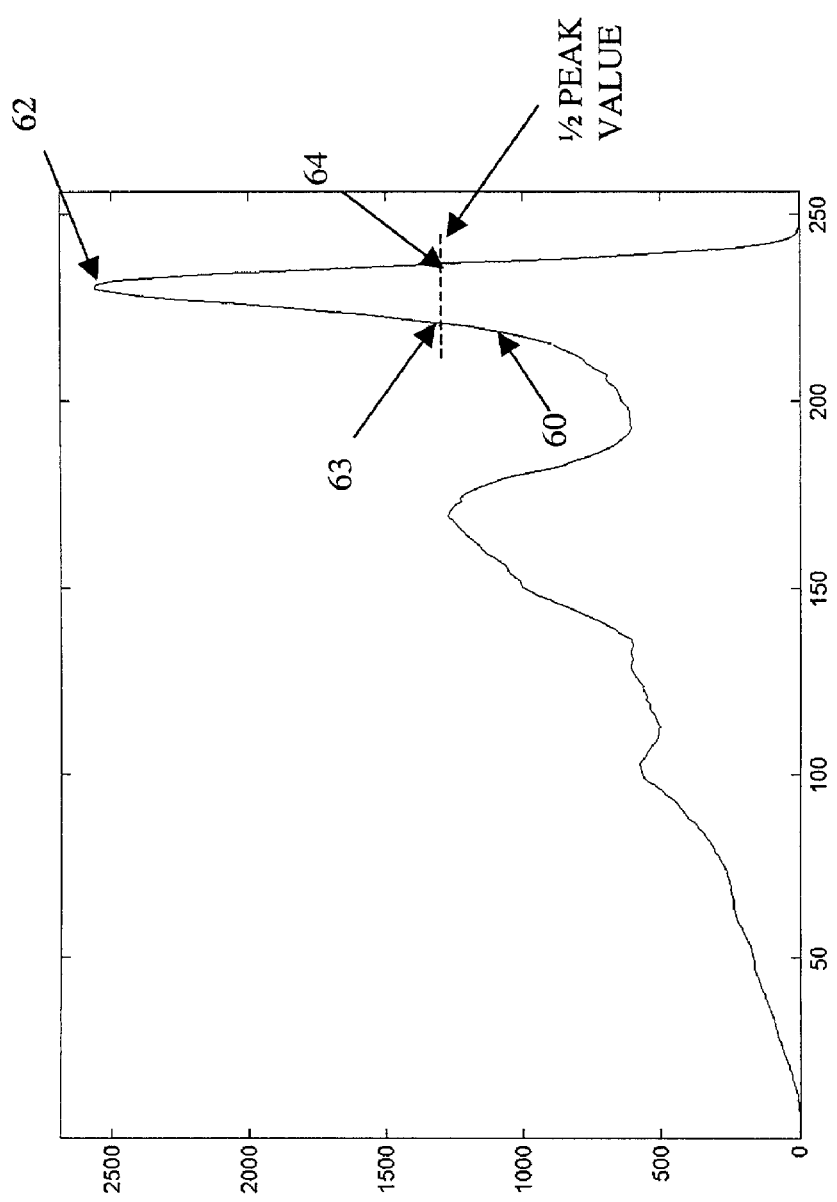
FIG. 6A shows an example of an edge luminance histogram used for estimating a global background tone value when performing statistical analysis according to one embodiment of the present invention.
Figure 6B:
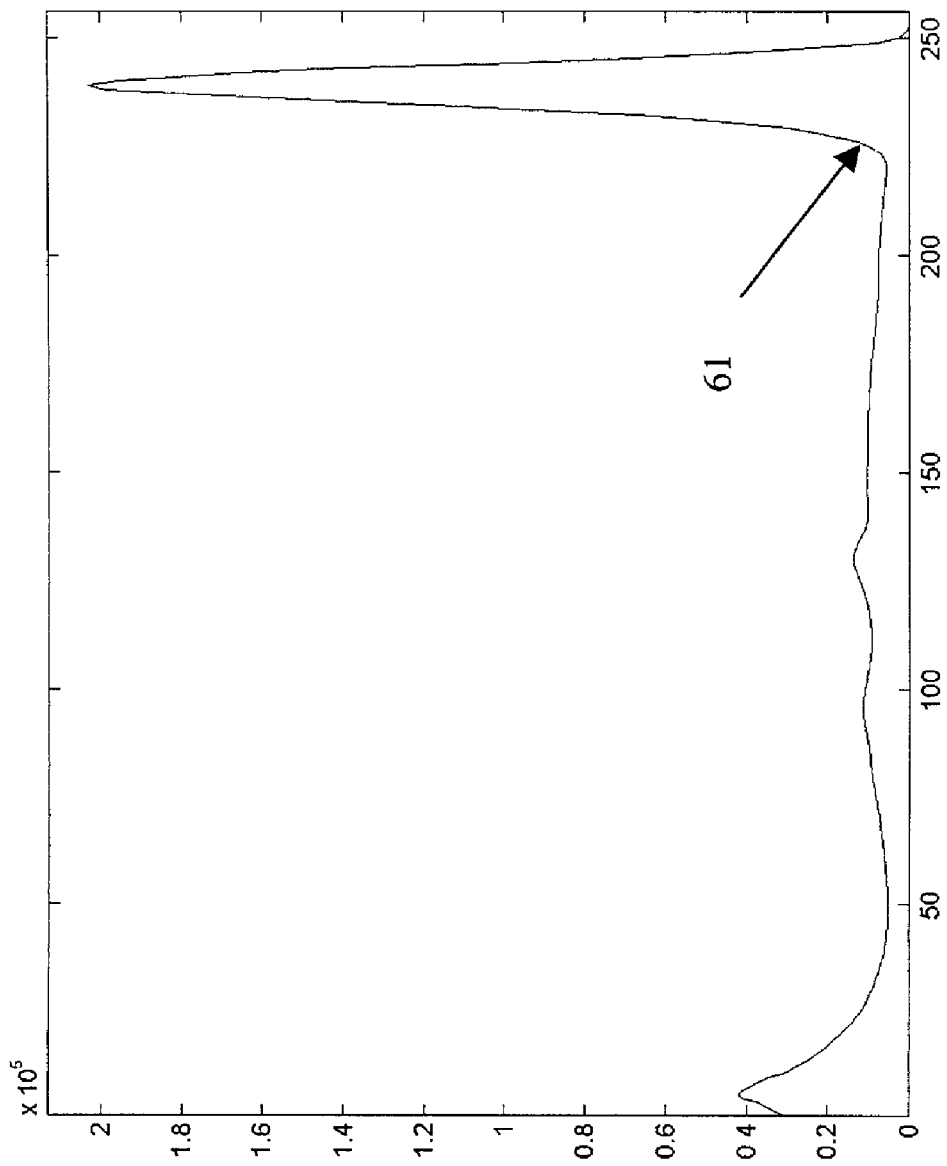
FIG. 6B shows an example of luminance histogram corresponding to all image pixels used for estimating a global background tone value when performing statistical analysis according to one embodiment of the present invention.

The estimated background luminance is determined using two histograms computed by statistical analysis of the image data. One of the histograms corresponds to all pixel luminance values and is denoted $H_a$, and the other for the histograms corresponds to luminance values of pixels on the bright side of edges (as determined above) and is denoted $H_e$. FIGS. 6A and 6B show examples of an edge luminance histogram $H_e$ and the histogram $H_a$ corresponding to all pixel values. A thresholding algorithm, referred to as the Kittler-Illingworth algorithm is used to analyze the $H_e$ histogram and based on this analysis a background threshold value is estimated. The Kittler-Illingworth algorithm as applied to background tone estimation is described in U.S. application Ser. No. 09/704,358 entitled "System and Method for Enhancing Scanned Document Images for Color Printing" filed Nov. 1, 2000 and assigned to the assignee of the subject application reference above. In particular, the Kittler-Illingworth algorithm finds within each histogram a valley that corresponds to a minimum error threshold value. The minimum error threshold value corresponds to a threshold value that minimizes a global error measure of replacing all gray level values with binary values, (i.e., replacing pixel values higher than the threshold with a pixel value of 255 and replacing pixel values lower than the threshold with a pixel value of 0). This optimal minimum error threshold value occurs within the main valley of each histogram as approximately shown by indicators 60 and 61 in FIGS. 6A and 6B.

Using the minimum error threshold value 60 for the edge histogram $H_e$, a threshold value $W_e$ corresponding to the peak 62 between the valley (i.e., minimum error threshold value) and 255 is determined for the edge histogram $H_e$. From the peak luminance value for the edge histogram $H_e$, a $I_{high}$ value and a $I_{low}$ value is determined corresponding to the points where histogram $H_e$ falls to half of the peak value (63 and 64, FIG. 6A). Next, a spread index is determined from the $I_{high}$ and $I_{low}$ values for histogram $H_e$. The spread index is defined as:

$$S_e=(I_{high}-I_{low})/256 \qquad (3)$$

The spread index is used as a confidence measure of the estimate.

As described above, a minimum error threshold value is obtained for histogram $H_a$ using the Kittler-Illingworth algorithm. This minimum error threshold value (61, FIG. 6B) is designated as threshold value $W_a$. The threshold values, $W_e$ and $W_a$, are shown in FIGS. 6A and 6B by indicators 62 and 61.

Figure 7:
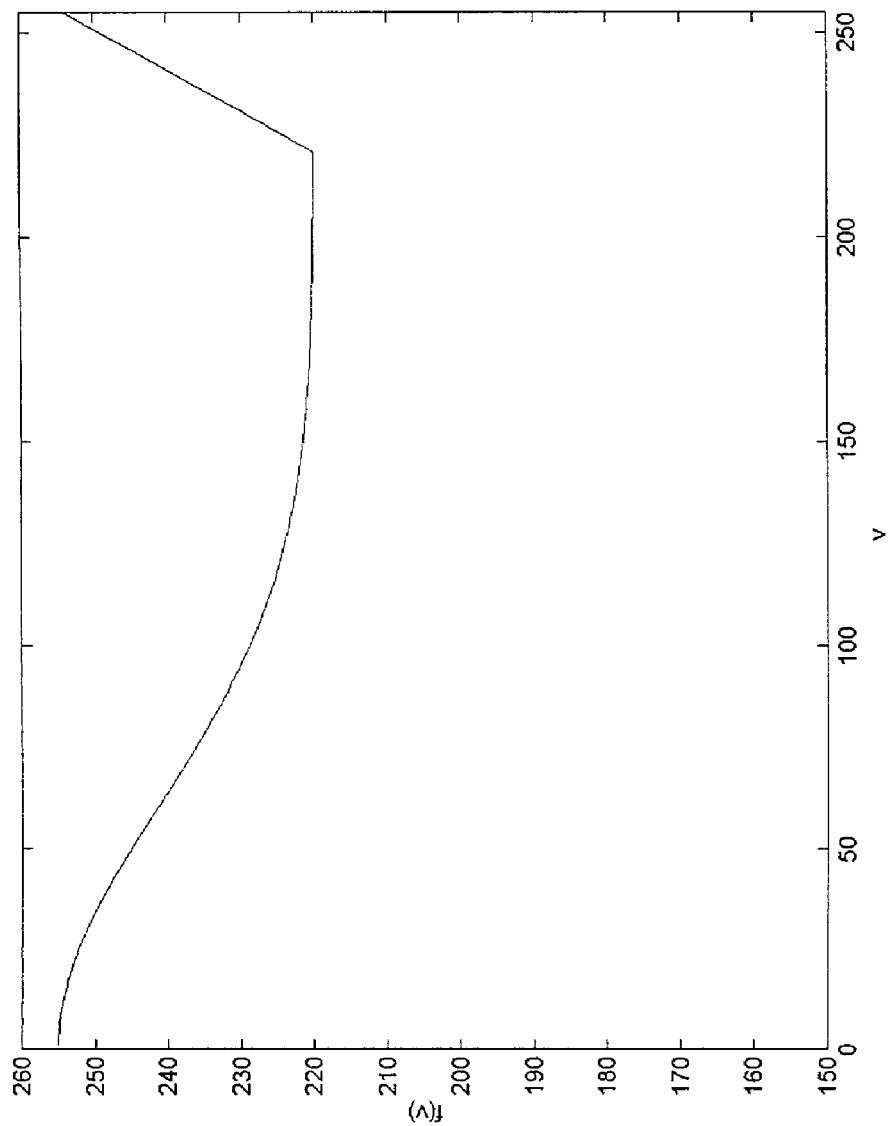
FIG. 7 shows a limiting function used when performing statistical analysis according to one embodiment of the present invention.

A minimum acceptable estimated value MIN_WHITE is established for the background threshold information $W_e$ and $W_a$ by embedding MIN_WHITE in a non-linear function, $f$. That is $W_e'=f(W_e)$ and $W_a'=f(W_a)$. For images with mostly black figures and little unprinted regions, the background threshold information $W_e$ and $W_a$ are usually far below the minimum acceptable value. In these cases, it may be desirable to reduce the effect of background removal that will be performed on the image, or even to not perform background removal. This can be effectively realized by functions such as the following limiting function.

$$f(v) = \begin{cases} v, \text{if } v > \text{MIN\_WHITE} \\ (255.0 - \text{MIN\_WHITE}) \cdot \exp(-(r \cdot \text{MIN\_WHITE}/255 \cdot v/255)^2) + \\ \text{MIN\_WHITE, otherwise} \end{cases} \qquad (4)$$

for $v=(W_e, W_a)$. The limiting function $f(v)$ with MIN_WHITE=220 and r=3.5 is shown in FIG. 7. Other functions characterized by three distinct regions may also be used to achieve a similar effect.

Next, the estimated background luminance $Y_b$ is obtained according to Eqs. 5 and 6 by a weighted averaging of the two estimations, $W_e'$ and $W_a'$, obtained from the above function (Eq. 4).

$$Y_b=p_e \cdot W_e'+(1-p_e) \cdot W_a' \qquad (5)$$

$$\text{where } p_e=(1-S_e) \cdot \tan h(\alpha \cdot N_e/N_a) \qquad (6)$$

In a preferred embodiment $\alpha=4000$. The statistical confidence, $p_e$, increases with diminishing spread index of the edge histogram ($S_e$), and with increasing population of light edge pixels ($N_e$) relative to the general pixel count $N_a$ (Eq. 6). In the preferred embodiment, Eq. 6 is used for edge related weighting. Note that the weight can obtain only values between 0 and 1.

Once an estimated global background tone value is obtained by either of statistical modules 21 or 41 (FIGS. 2A and 4A, respectively) it is in one embodiment provided to the background noise removal tonemap derivation module 23 in accordance with FIGS. 2A and 3 or it is stored by the data storage module 43 in accordance with FIGS. 4A and 5. A background noise removal tonemap is constructed according to the following considerations:

For an effective bleaching of the background it is preferred that all pixels with luminance lighter than $Y_b$ map to pure white: $Q(Y>Y_b)=255$.

In order to avoid unnecessary lightening of pixels which are much darker than the background luminance, the mapping should to converge to identity when Yb−Y>>255−Yb:

$$Q\left(Y: \frac{Y_b - Y}{255 - Y_b} \gg 1\right) \approx Y$$

The transition between the mapping of very light and very dark luminance should be graceful to avoid artifacts.

The tone-mapping function used in one preferred embodiment which fulfills the above requirements is:

$$Q(Y) = \begin{cases} Y \geq Y_b & 255 \\ Y < Y_b & Y + (255 - Y_b) \cdot \left[1 - \tanh\left(\frac{Y_b - Y}{255 - Y_b}\right)\right] \end{cases} \qquad (7)$$

Figure 8:
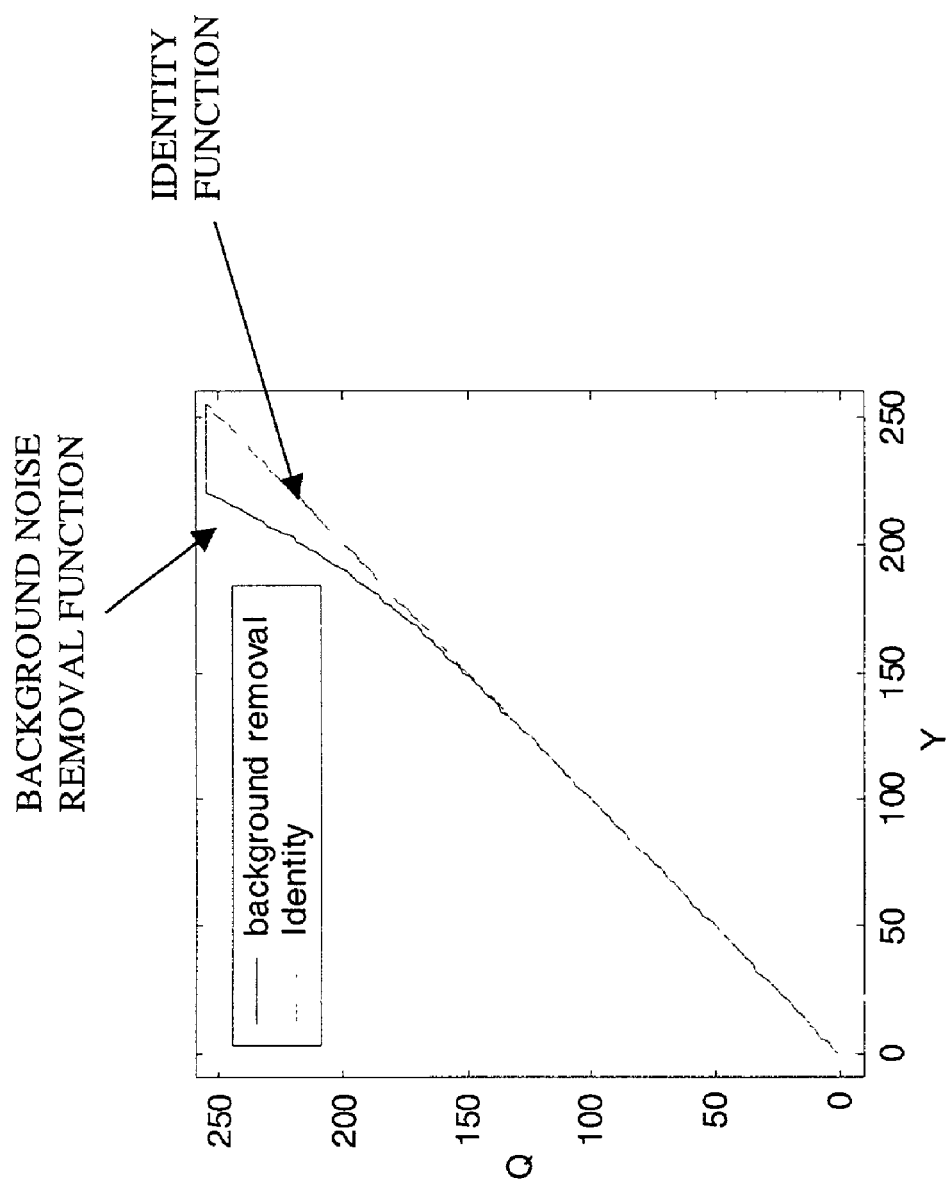
FIG. 8 shows an example of a tonemap function in which $Y_b=220$.

FIG. 8 shows the above function in which $Y_b=220$.

It should be understood that the modules shown in FIGS. 2A, 2B, 4A and 4B can be implemented as any combination of software, hardware, or firmware.

In the preceding description, numerous specific details are set forth in order to provide a thorough understanding of the present invention. It will be apparent, however, to one skilled in the art that these specific details need not be employed to practice the present invention. In addition, it is to be understood that the particular embodiments shown and described by way of illustration is in no way intended to be considered limiting. Reference to the details of these embodiments is not intended to limit the scope of the claims.

We claim:

1. A method of processing a digital image corresponding to a scanned document, the method comprising:
   analyzing the image to obtain statistical data;
   deriving background noise removal data for the entire image based on the statistical data; and
   storing the entire image and the background noise removal data to allow the scanned document to be displayed with background noise removal and without background noise removal.

2. The method as described in claim 1 further comprising pre-processing the image while analyzing the image and using intermediate results obtained from pre-processing the image to obtain the statistical data.

3. The method as described in claim 1 wherein the background noise removal data includes a tonemap function or sampled values of the tonemap function.

4. The method as described in claim 1 wherein the image and the background noise removal data are stored together.

5. The method as described in claim 1 wherein analyzing the image further comprises estimating a global background tone value.

6. The method as described in claim 5 wherein the background noise removal data is derived from the global background tone value.

7. The method as described in claim 1 wherein the image is color-converted to a luminance-chrominance color space prior to obtaining the statistical data, and wherein the statistical data is obtained from the luminance channel.

8. The method of claim 1 wherein the statistical data and the background noise removal data are obtained in real time, as the document is being scanned.

9. The method of claim 1, further comprising providing user selection to interactively:
   in a first case, use the stored image and the stored data to remove background noise from the stored image prior to rendering the stored image; and
   in a second case, bypass background noise removal in the stored image prior to rendering the stored image.

10. The method as described in claim 9 further comprising providing a user interface including an option allowing the selection of background noise removal on a page-by-page basis.

11. A system for processing a digital image corresponding to a scanned document, the system comprising:
    statistical analyzer for analyzing the image to obtain statistical data;
    function derivator for deriving background noise removal data for the image based on the statistical data; and
    data storage for storing the image and the background noise removal data together to allow the scanned document to be displayed with background noise removal and without background noise removal.

12. The system as described in claim 11 wherein the statistical analyzer pre-processes the image while analyzing the image and uses intermediate results obtained from pre-processing the image to obtain the statistical data.

13. The system as described in claim 11 wherein the background removal data includes a tonemap function or sampled values of the tonemap function.

14. The system as described in claim 11 further comprising a user interface for allowing display of the scanned document with and without background noise removal.

15. The system as described in claim 14 wherein the user interface includes an option allowing the selection of background noise removal on a page-by-page basis.

16. Apparatus comprising a processor for processing a digital image, the processing including:
    analyzing the digital image to obtain statistical data;
    using the statistical data to derive tonemap data that maps a background of the image, including noise in the background, to a preferred tone; and
    storing the entire image and the tonemap data to allow the digital image to be displayed with and without the background mapped to the preferred tone.

* * * * *